US012634065B2

(12) United States Patent
Xu et al.

(10) Patent No.: US 12,634,065 B2
(45) Date of Patent: May 19, 2026

(54) COMMUNICATION METHOD AND APPARATUS

(71) Applicant: GUANGDONG OPPO MOBILE TELECOMMUNICATIONS CORP., LTD., Dongguan (CN)

(72) Inventors: Weijie Xu, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 206 days.

(21) Appl. No.: 17/874,699

(22) Filed: Jul. 27, 2022

(65) Prior Publication Data

US 2022/0368492 A1 Nov. 17, 2022

Related U.S. Application Data

(63) Continuation of application No. PCT/CN2020/074656, filed on Feb. 10, 2020.

(51) Int. Cl.
| | |
|---|---|
| *H04W 72/0453* | (2023.01) |
| *H04L 5/00* | (2006.01) |
| *H04W 72/23* | (2023.01) |

(52) U.S. Cl.
CPC .......... *H04L 5/0048* (2013.01); *H04L 5/0005* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2019/0305916 A1 | 10/2019 | Liao | | |
| 2019/0313332 A1* | 10/2019 | Wu | ................... | H04W 52/0219 |

(Continued)

FOREIGN PATENT DOCUMENTS

| | | |
|---|---|---|
| CN | 109788580 A | 5/2019 |
| CN | 109802781 A | 5/2019 |

(Continued)

OTHER PUBLICATIONS

The first Office Action of corresponding Indian application No. 202217044367 dated on Sep. 26, 2023.

(Continued)

*Primary Examiner* — The Hy Nguyen
(74) *Attorney, Agent, or Firm* — Ladas & Parry LLP

(57) ABSTRACT

Embodiments of the present disclosure provide a communication method and apparatus. The method includes: acquiring configuration information of at least one initial active downlink bandwidth part BWP; and determining a first initial active downlink BWP corresponding to a terminal device according to the configuration information of the at least one initial active downlink BWP. A terminal device determines a first initial active downlink BWP corresponding to the terminal device according to configuration information of at least one initial active downlink BWP, so as to ensure that each terminal device selects an initial active downlink BWP according to its actual requirements, thereby avoiding a problem of low communication efficiency caused by the same initial active downlink BWP of each terminal device.

13 Claims, 7 Drawing Sheets

Acquire configuration information of at least one initial active downlink bandwidth part BWP — S501

Determine a first initial active downlink BWP corresponding to the terminal device according to the configuration information of the at least one initial active downlink BWP — S502

(56) References Cited

U.S. PATENT DOCUMENTS

| | | | |
|---|---|---|---|
| 2020/0022068 A1* | 1/2020 | Ly | H04J 11/0073 |
| 2020/0221499 A1* | 7/2020 | Hofström | H04W 24/08 |
| 2022/0264589 A1* | 8/2022 | Sun | H04W 74/0833 |

FOREIGN PATENT DOCUMENTS

| | | | | |
|---|---|---|---|---|
| CN | 110035512 A | 7/2019 | | |
| CN | 110168972 A | 8/2019 | | |
| CN | 110691415 A | 1/2020 | | |
| WO | 2019160481 A | 8/2019 | | |
| WO | WO-2019208994 A1 * | 10/2019 | | H04W 48/12 |
| WO | 2021010786 A1 | 1/2021 | | |

OTHER PUBLICATIONS

International Search Report (ISR) dated Oct. 27, 2020 for Application No. PCT/CN2020/074656.

Written Opinion (WOSA) dated Oct. 27, 2020 for Application No. PCT/CN2020/074656.

MediaTek Inc.:'Further Clarification on BWP Configuration in RRC' 3GPP TSG-RAN WG2 Meeting AH-1801 R2-1800648 Jan. 26, 2018.

The EESR of corresponding European application No. 20919155.0 dated on Nov. 10, 2022.

Panasonic, On default bandwidth part, R1-1710787,3GPP TSG-RAN WG1 NR Ad-Hoc#2, Qingdao, P. R. China Jun. 27-30, 2017.

ETRI, Remaining details of bandwidth part for initial access, R1-1715770, 3GPP TSG RAN WG1 Meeting NR Ad-Hoc #3, Nagoya, Japan, Sep. 18-21, 2017.

The first Office Action of corresponding European application No. 20919155.0 dated on Sep. 20, 2024.

The second Office Action of corresponding European application No. 20919155.0 dated on Jul. 11, 2025.

The Hearing Notice of corresponding Indian application No. 202217044367 dated on May 5, 2025.

The Hearing Notice of corresponding Indian application No. 202217044367 dated on Jun. 12, 2025.

The Hearing Notice of corresponding Indian application No. 202217044367 dated on Jan. 9, 2026.

* cited by examiner

Network device

Terminal device

Frequency domain

Corresponding device identification of terminal device

Initial active downlink BWP1    42

Initial active downlink BWP2    49

Initial active downlink BWP0    70

Initial active downlink BWP3  35，27

Time domain

| Initial active downlink BWP | 0 | 1 | 2 |
|---|---|---|---|
| Access level of terminal device | 1，2 | 3，4，5 | 6 |

First corresponding relationship

| Initial active downlink BWP | 0 | 1 | 2 |
|---|---|---|---|
| Service type of terminal device | Voice service | Data stream service | Web browsing service |

Second corresponding relationship

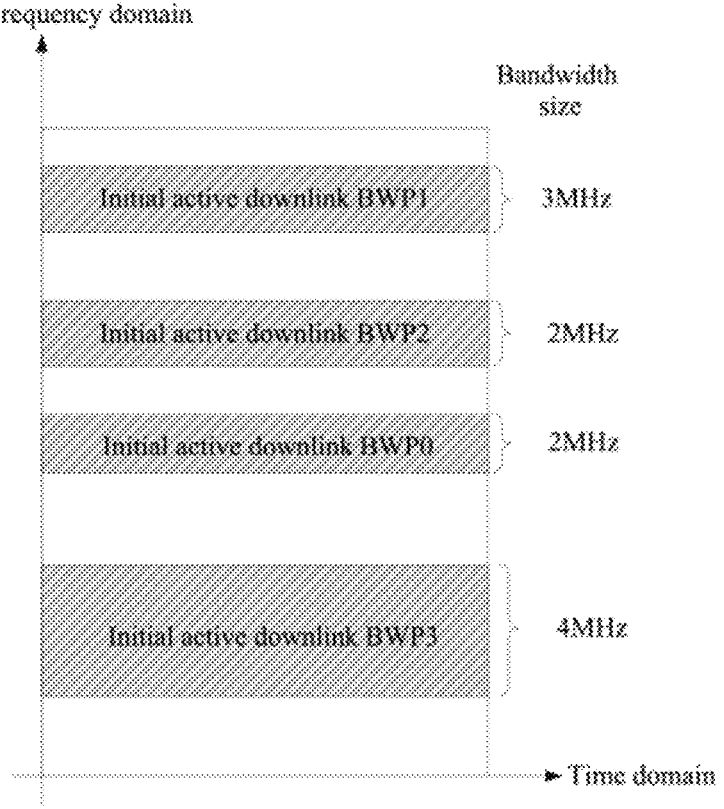
FIG. 12
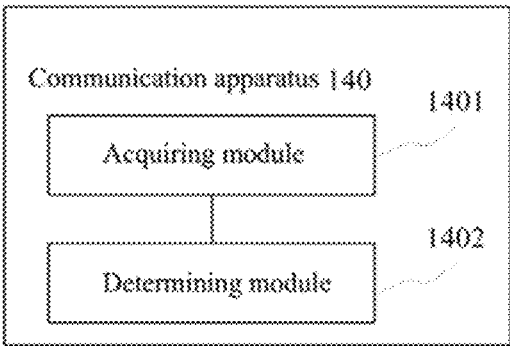
Send configuration information of at least one
initial active downlink bandwidth part BWP to
a terminal device                                    S1301
FIG. 13
Communication apparatus 140
Acquiring module                    1401
Determining module                 1402
FIG. 14

1

COMMUNICATION METHOD AND APPARATUS

CROSS-REFERENCE TO RELATED APPLICATIONS

This disclosure is a continuation of International Application No. PCT/CN2020/074656, filed on Feb. 10, 2020, the disclosure of which is hereby incorporated by reference in its entirety.

TECHNICAL FIELD

The present disclosure relates to communication technologies and, in particular, to a communication method and apparatus.

RELATED ART

In 5G new radio (NR), in order to reduce power consumption of a terminal device, a network device will configure a bandwidth part (bandwidth part, BWP) for the terminal device, and the terminal device may communicate with the network device through the BWP.

At present, before an initial access procedure is completed, an initial active downlink BWP is determined by the terminal device based on a remaining minimum system information (RMSI) control resource set (CORESET), where a bandwidth size and a bandwidth position of the initial active downlink. BWP are the same as a bandwidth size and a bandwidth position of the RMSI CORESET. The RMSI CORESET is cell-level information, so terminal devices in a same cell have a same initial active downlink BWP.

However, different terminal devices have different characteristics, so the requirements for the initial active downlink BWP are also different. Determining the initial active downlink BWP of the terminal device according to the RMSI CORESET may result in low communication efficiency.

SUMMARY

Embodiments of the present disclosure provide a communication method and apparatus to avoid a problem of low communication efficiency caused by determining an initial active downlink BWP of a terminal device according to an RMSI CORESET.

In a first aspect, an embodiment of the present disclosure provides a communication method, including:
acquiring configuration information of at least one initial active downlink bandwidth part BWP; and
determining a first initial active downlink BWP corresponding to a terminal device according to the configuration information of the at least one initial active downlink BWP.

In a second aspect, an embodiment of the present disclosure provides a communication method, including:
sending configuration information of at least one initial active downlink bandwidth part BWP to a terminal device.

In a third aspect, an embodiment of the present disclosure provides a communication apparatus, including:
an acquiring module, configured to acquire configuration information of at least one initial active downlink bandwidth part BWP; and

a determining module, configured to determine a first initial active downlink BWP corresponding to a terminal device according to the configuration information of the at least one initial active downlink BWP.

In a fourth aspect, an embodiment of the present disclosure provides a communication apparatus, including:
a sending module, configured to send configuration information of at least one initial active downlink bandwidth part BWP to a terminal device.

In a fifth aspect, an embodiment of the present disclosure provides a terminal device, including: a transceiver, a processor, and a memory;
where the memory has stored therein computer executable instructions;
the processor executes the computer executable instructions stored in the memory to cause the processor to execute the communication method in the above first aspect.

In a sixth aspect, an embodiment of the present disclosure provides a network device, including: a transceiver, a processor, and a memory;
where the memory has stored therein computer executable instructions;
the processor executes the computer executable instructions stored in the memory to cause the processor to execute the communication method in the above second aspect.

In a seventh aspect, an embodiment of the present disclosure provides a computer readable storage medium, having computer executable instructions stored thereon, where when the computer executable instructions are executed by a processor, the communication method in the above first aspect is implemented.

In an eighth aspect, an embodiment of the present disclosure provides a computer readable storage medium, having, computer executable instructions stored thereon, where when the computer executable instructions are executed by a processor, the communication method in the above second aspect is implemented.

Embodiments of the present disclosure provide a communication method and apparatus. The method includes: acquiring configuration information of at least one initial active downlink bandwidth part BWP; and determining a first initial active downlink BWP corresponding to a terminal device according to the configuration information of the at least one initial active downlink BWP. A terminal device determines a first initial active downlink BWP corresponding to the terminal device according to configuration information of at least one initial active downlink BWP, so as to ensure that each terminal device selects an initial active downlink BWP according to its actual requirements, thereby avoiding a problem of low communication efficiency caused by the same initial active downlink BWP of each terminal device.

BRIEF DESCRIPTION OF DRAWINGS

FIG. 12 is a schematic diagram of a size of a bandwidth of at initial active downlink BWP according to an embodiment of the present disclosure;

FIG. 13 is a second flowchart of a communication method according to an embodiment of the present disclosure;

FIG. 14 is a first schematic structural diagram of a communication apparatus according to an embodiment of the present disclosure;

DESCRIPTION OF EMBODIMENTS

Figure 1:
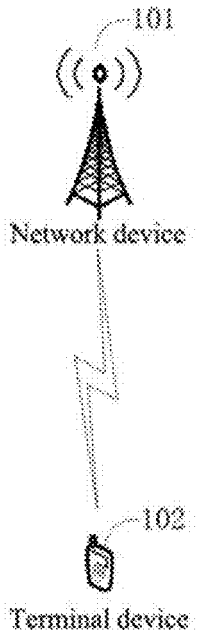
FIG. 1 is a schematic diagram of a communication scenario according to an embodiment of the present disclosure.

To facilitate understanding, the concepts involved in the present disclosure are first illustrated.

3GPP: 3rd Generation Partnership, the third generation partnership project.

Terminal device: it may be a device that includes wireless transceiver functions and can cooperate with a network device to provide communication services for users. Specifically, the terminal device may refer to user equipment (UE), an access terminal, a subscriber unit, a user station, a mobile station, a mobile platform, a remote station, a remote terminal, a mobile device, a user terminal, a terminal, a wireless communication device, a user agent or user apparatus. For example, the terminal device may be a cellular telephone, a cordless telephone, a session initiation protocol (SIP) telephone, a wireless local loop (WLL) station, a personal digital assistant (PDA), a handheld device with wireless communication functions, a computing device or other processing device connected to a wireless modem, an on-board device, a wearable device, a terminal device in a future 5G network or a terminal device in a post-5G network, etc.

Network device: the network device may be a device which is used to communicate with the terminal device, for example, it may be a base station (BTS) in a global system for mobile communication (GSM) or a code division multiple access (CDMA) communication system, it may also be a base station (NodeB, NB) in a wideband code division multiple access (WCDMA) system, or may also be an evolved base station (Evolutional NodeB, eNB or eNodeB) in an LTE system, or the network device may be a relay station, an access point, an on-board device, a wearable device, or a network side device in a future 5G network or a post-5G network, or a network device in a future evolved public land mobile network (PLMN) network, etc.

The network device involved in the embodiments of the present disclosure may also be referred to as a radio access network (RAN) device. The RAN device is connected to the terminal device and is used to receive data from the terminal device and send same to a core network device. The RAN device corresponds to a different device in a different communication system, which, for example, corresponds to a base station and a base station controller in a 2G system, corresponds to a base station and a radio network controller (RNC) in a 3G system, corresponds to an evolved base station (Evolutional NodeB, eNB) in a 4G system, and corresponds to a 5G system in a 5G system, such as an access network device (such as a gNB, a centralized unit CU, or a distributed unit DU) in NR.

Control resource set (CORESET): it is a type of time-frequency resource sets introduced in NR, and the UE performs a PDCCH detection in a corresponding control resource set. The control resource set consists of a set of resource element groups (REG).

Search space: the search space in the LTE system is defined as a series of control channel element (CCE) resources for each aggregation level that require blind detection, including starting positions of the CCEs and the number of candidate resources.

Common search space: the common search space (CSS), where one common search space is jointly used by all UEs in a cell.

Random access procedure: the random access procedure refers to a procedure before the terminal device transmits a random access preamble and establishes a basic signaling connection with the network device. It refers to a procedure where the terminal device establishes a wireless link with the network device to acquire or restore uplink synchronization. Random access is a key step in a mobile communication system, making it possible for ale terminal device to establish a communication connection with the network device. The terminal device exchanges information with the network device through the random access, and the uplink synchronization can also be achieved through the random access.

Preamble: the preamble, i.e., a preamble code, is a series of sequences sent by the terminal device to apply for a network access, including but not limited to, a gold sequence, an in sequence, a ZC sequence, etc. In addition to a main sequence, the composition of the preamble may also include a cyclic prefix and a guard time.

Subcarrier: the terminal device may support multiple subcarrier spacing types, such as 15 kHz, 30 kHz, 60 kHz, 120 kHz, 240 kHz and/or 480 kHz. In an orthogonal frequency division multiplexing (OFDM) system, a subcarrier spacing type is inversely proportional to a length of an OFDM symbol, that is, the greater the subcarrier spacing, the shorter the length of the OFDM symbol. For example, in FIG. 2, a time length of an OFDM symbol corresponding to subcarrier spacing of 15 kHz is 4 times a time length of an OFDM symbol corresponding to subcarrier spacing of 60 kHz.

In the following, an applicable scenario of the communication method in the present disclosure will be illustrated with reference to FIG. 1.

FIG. 1 is a schematic diagram of a communication scenario according to an embodiment of the present disclosure. Please refer to FIG. 1, including a network device 101 and a terminal device 102, where the network device 101 and the terminal device 102 may perform wireless communications with each other.

A network including the network device 101 and the terminal device 102 may also be called a non-terrestrial communication network (NTN), where NTN refers to a communication network between a terminal device and a satellite (also called a network device).

It may be understood that technical solutions of the embodiments of the present disclosure may be applied to a new radio (NR) communication technology. NR refers to a new generation of radio access network technology, which may be applied to a future evolution network, such as a future 5th generation mobile communication (5G) system. The solutions in the embodiments of the present disclosure may also be applied to other wireless communication networks such as wireless fidelity (WIFI) and long term evolution (LTE), and corresponding names may also be replaced by names of corresponding functions in other wireless communication networks.

A network architecture and a service scenario described in the embodiments of the present disclosure are intended to illustrate the technical solutions of the embodiments of the present disclosure more clearly, and do not constitute a limitation on the technical solutions provided in the embodiments of the present disclosure. Those of ordinary skill in the art may know that with the evolution of the network architecture and the emergence of new service scenarios, the technical solutions provided in the embodiments of the present disclosure are also applicable to similar technical problems.

The relevant technical background of the present disclosure will be described in the following.

With the continuous evolution and assistance of wireless communication technology the Internet of things (IoT) technology has also ushered in a rapid development, such as machine type communication (MTC)/enhanced machine type communication (eMTC) promoted by the 3GPP organization and series of standards of a narrow band Internet of things (NB-IoT) have become a candidate technical standard for 5G massive (Massive) MTC technology.

The technical standards introduced above are expected to play a huge role in all aspects of people's production and life, such as smart homes, smart cities, smart factories, remote monitoring, and smart transportation.

At present, the existing MTC/eMTC terminal devices and NB-IoT terminal devices have the following technical advantages: a low cost, a low price, support for an ultra-low power consumption mode, and support for deep and broad coverage scenarios; these technical advantages are conducive to a rapid popularity of the Internet of things technology in an early stage of development.

However, these technical advantages also correspondingly make the MTC/eMTC and NB-IoT have limitations in some application scenarios. It may be understood that a design goal of MTC/eMTC and NB-IoT is to support some applications with a low data rate and a relatively high transmission delay. Therefore, for some Internet of Things scenarios that require a relatively high rate, such as video surveillance in smart security, industrial applications that require a relatively low latency, and other Internet of Things scenarios, the MTC/eMTC terminal devices and NB-IoT terminal devices introduced above cannot be used.

In this case, if an NR terminal device is used directly, since design indicators of the NR terminal device, such as a transmission rate, a transmission delay and other aspects, greatly exceed actual requirements of the above-described Internet of Things scenarios that require the relatively high rate, the direct application of the NR terminal device to the Internet of Things scenarios introduced above will render a relatively high cost, which will lead to unfavorable market competition.

Based on the above-mentioned problems, in order to perfect a terminal system of a 5G massive MTC scenario, currently, it is necessary to design an NR MTC terminal device that supports a medium transmission rate and medium delay requirements, and at the same time has a relatively low cost. At present, the 3GPP terms this type of NR MTC terminal device as an NR-light terminal device.

Based on the content introduced above, it may be determined that the NR-light terminal device is required to support a medium transmission rate and medium delay requirements, and to have a relatively low cost. In order to enable the NR-light terminal device to meet these requirements, at present, the following technologies may be adopted.

In a possible implementation, costs of the terminal device may be reduced by reducing receiving channels supported by the terminal device.

Specifically, the current NR terminal device needs to support at least 2 receiving channels, and the NR terminal device needs to support 4 receiving channels in some frequency bands, where each receiving channel includes a receiving antenna, a filter, a power amplifier (PA), an analog to digital (AD) sampler and other components.

Therefore, reducing the number of radio frequency channels (receiving channels) with which the NR terminal device needs to be equipped may significantly reduce the cost of the terminal device. Research results show that if a terminal device with two radio frequency channels is reduced to a terminal device with one radio frequency channel, the cost of a chip module of the terminal device may be reduced by about ⅓. Therefore, in the NR-light terminal device, the number of receiving channels and the number of assembled antennas can be reduced, so as to reduce the cost of the terminal device.

In a further possible implementation, the transmission bandwidth supported by the terminal device may be reduced to reduce the cost of the NR-light terminal device and reduce the power consumption of the NR-light terminal device.

Specifically, a normal NR terminal device usually supports a relatively wide transmission bandwidth, for example, the current 5G frequency range definition includes: FR1 (450 MHz-6000 MHz, also known as Sub-6 GHz) and FR2 (24250 MHz-52600 MHz, also known as Above-6 GHz or millimeter wave), where the terminal device corresponding to FR1 is required to support a maximum bandwidth of 100 MHz.

In order to reduce the cost of the NR-light terminal device and reduce the power consumption of the NR-light terminal device, the NR-light terminal device may be set to support a relatively small terminal bandwidth. For example, the NR-light terminal device may only support a terminal bandwidth of 5 MHz (Mega Hertz, MHz) or 10 MHz, or 20 MHz in FR1.

Regarding the further possible implementation described above, those skilled in the art may understand that in 5G NR, the system bandwidth and terminal bandwidth may reach a bandwidth of hundreds of MHz or even several GHz to support high-speed mobile data transmission. However, in an actual data transmission, such a large bandwidth is not required all the time, for example, in an operating scenario that only needs to support low data rate transmission (such as chat in WeChat), the terminal device only needs to adopt a small operating bandwidth, for example, a bandwidth of 10 MHz is sufficient.

In order to flexibly support different bandwidth requirements of the above different scenarios, 5G introduces a concept of bandwidth part (BWP).

The bandwidth part may be a pan of the system bandwidth (cell carrier bandwidth), for example, if the system bandwidth is 100 MHz, the terminal device may adopt a bandwidth less than 100 MHz, for example, a bandwidth part of 20 MHz or 50 MHz may be adopted for data transmission within the system bandwidth. The bandwidth part may also be called "carrier bandwidth part (carrier bandwidth part)", or may be called "operating bandwidth (operating bandwidth)", or transmission bandwidth. The name and abbreviation of the bandwidth part are not particularly limited in the embodiments of the present disclosure.

Regarding an architecture of the communication system shown in FIG. 1, in 5G NR, BWP is supported in either a frequency division duplex (FDD) or time division duplex (TDD) system.

For example, a BWP may include K>0 continuous or discontinuous subcarriers; or, a BWP may be a frequency domain resource where N>0 non-overlapping continuous or discontinuous resource blocks (Resource Block) are located; or, a BWP is a frequency domain resource where M>0 non-overlapping continuous or discontinuous resource block groups (Resource Block Group, RBG) are located, an RBG includes P>0 continuous RBs, where K, N, M, and P are all integers.

In a possible implementation, the NR terminal device may be configured with a maximum of 4 BWPs by high-level signaling, where the terminal device only needs to adopt a center frequency point and a sampling rate of a corresponding BWP within the corresponding BWP. Moreover, each BWP not only has a different frequency point and bandwidth, each BWP may correspond to a different configuration. For example, each BWP may be configured with a different subcarrier spacing, CP type, or synchronization signal block (SSB) period to adapt to different services, where SSB may also be referred to as synchronization signal/physical broadcast channel block (SS/PBCHblock).

The network device may make the terminal device switch between multiple BWPs according to the service requirements of the terminal device. For example, the terminal device may use a larger bandwidth BWP when transmitting at a higher service rate; the terminal device may use a smaller bandwidth BWP when transmitting at a lower service data rate.

Figure 2:
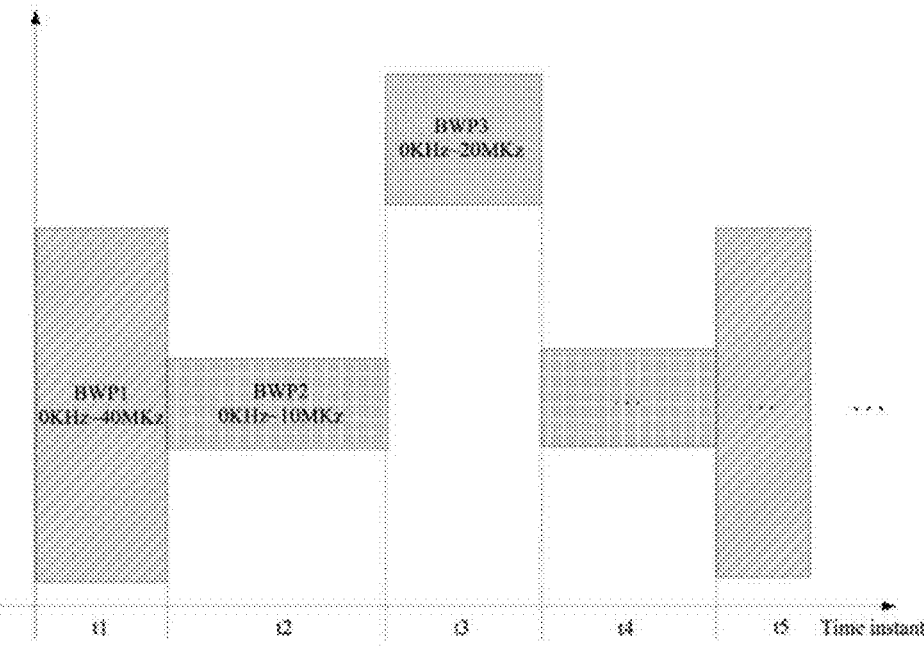
FIG. 2 is a schematic diagram of a BWP according to an embodiment of the present disclosure.

A possible implementation of BWP is introduced below with reference to FIG. 2. FIG. 2 is a schematic diagram of BWP according to an embodiment of the present disclosure.

As shown in FIG. 2, there are currently multiple time instants:

assuming that at a first time instant t1, a terminal device has a large amount of services, a network device may configure a large bandwidth (BWP1) for the terminal device, and it may be assumed that BWP1 has a frequency range of 0 KHz-40 MKz;

assuming that at a second time instant t2, the terminal device has a small amount of services, the network device may configure a small bandwidth (BWP2) for the terminal device, and it may be assumed that BWP2 has a frequency range of 0 KHz-10 MKz, as long as BWP2 can meet basic communication requirements of the terminal device.

assuming that at a third time instant t3, the network device finds that there is a wide range of frequency selective fading in the bandwidth of BWP1, or resources in the frequency range of BWP1 are relatively scarce, at this time, the network device may configure a new bandwidth (BWP3) for the terminal device, it may be assumed that BWP3 has a frequency range of 0 KHz-20 MKz.

Those skilled in the art may understand that the above introduction of BWP with reference to FIG. 2 shows an exemplary situation. In an actual implementation process, an implementation of BWP may be selected according to actual requirements, which is not particularly limited in the embodiment.

In the actual implementation process, BWP may be divided into downlink BWP (Downlink BWP, DL BWP) and uplink BWP (UL BWP), where the network device may configure multiple DL BWPs and multiple UL BWPs for the terminal device, and activate at least one DL BWP and at least one UL BWP.

In a possible implementation, the terminal device may send uplink signals on a UL BWP in an active state, including but not limited to, uplink control signaling, uplink data, a scheduling request (SR), a sounding reference signal (SRS), channel state information (CSI)/channel quality indicator (CQI) feedback, etc.; and the terminal device may receive, on a DL BWP in an active state (i.e., active DL BWP), downlink signals sent by the network device, including but not limited to, downlink control signaling, downlink data, and a channel state information reference signal (CSI-RS).

On the basis of the content introduced above, the implementation in the prior art with regard to determining an initial active downlink BWP (initial active DL BWP) corresponding to the terminal device will be introduced below.

The procedures related to an initial access of the terminal device are all carried out in an NR initial active downlink BWP. Where the initial active downlink BWP may be used for but not limited to the following aspects: the terminal device reads system information, the terminal device receives a paging message, and the terminal device receives a downlink signal during a random access procedure. Those skilled in the art may understand that in the actual implementation process, a specific application of the initial active downlink BWP may also be selected according to actual requirements, which is not particularly limited in the embodiment.

In a possible implementation, before the initial access of the terminal device is completed, the initial active downlink BWP corresponding to the terminal device may be determined by the terminal device based on a remaining minimum system information (RMSI) CORESET, that is, a bandwidth size and a bandwidth position of the initial active downlink BWP are totally the same as the bandwidth size and bandwidth position occupied by the RMSI CORESET, and the subcarrier spacing of the initial active downlink BWP is also totally the same as the subcarrier spacing of the RMSI CORESET.

The configuration information of the RMSI CORESET is indicated in an NR PBCH, it should be noted that the RMSI CORESET is cell-level information. Therefore, all terminal devices in the same cell correspond to the same initial active downlink BWP before the initial access is completed.

In another possible implementation, after the initial access of the terminal device is completed, in an implementation, the network device may also configure a new initial active downlink BWP to the terminal device through configuration signaling, but the bandwidth of the new initial active downlink BWP needs to include the bandwidth of the above-described initial active downlink BWP before the initial access is completed, and the subcarrier spacing of the two is totally the same.

The problems exist in the prior an are:

on the one hand, specific characteristics of different NR-light terminals may be different (such as the supported bandwidth size, the number of supported antennas, etc.), so the requirements related to the initial active downlink BWP may also be different.

However, before the initial access is completed, the initial active downlink BWP corresponding to the terminal device in the same cell is the same, therefore, when each terminal device performs the initial access procedure, the corresponding initial active downlink BWP must be the same, this will cause a large number of terminal devices to perform random access procedures on the same initial active downlink BWP, which will lead to a reduction of communication efficiency.

On the other hand, the terminal bandwidth of the NR-light terminal device is relatively narrow, for example, 5 MHz or 10 MHz, since the bandwidth size of the BWP configured by the network device to the terminal device needs to be less than or equal to the maximum bandwidth that the terminal device can support, the bandwidth size of the BWP configured by the network device to the NR-light terminal device will also be relatively small.

For example, for a 5 MHz terminal device, the BWP configured by the network device needs to be less than or equal to 5 MHz, correspondingly, the bandwidth size of the initial active downlink BWP of the 5 MHz terminal device used for the initial access related procedure will also be less than or equal to 5 MHz.

However, NR-light terminal devices will be widely applied to a smart wear, an industrial Internet and other scenarios. Therefore, it is foreseeable that the number of terminal devices will be relatively large. However, if the initial active downlink BWP is relatively narrow (such as 5 MHz), it cannot support a large number of terminal devices' completion of transmission of information related to the initial access procedure.

Therefore, the solution in the prior an cannot realize that NR-light terminals with simply a small bandwidth but a large number complete the NR initial access procedure. In view of problems in the prior art, at present, there is a need for an enhanced solution to determine the initial active downlink BWP for accomplishment that NR-light terminals with simply a small bandwidth but a large number complete the NR initial access procedure.

Based on this, the present disclosure proposes the following, technical idea: a network device configures at least one initial active downlink BWP to a terminal device, and the terminal device determines an initial active downlink BWP required by itself according to the at least one initial active downlink BWP configured by the network device.

Before introducing the communication method according to the present disclosure, since the communication scenario involved in the present disclosure may be one where the terminal device performs a random access procedure to send a PRACH, based on this, the random access procedure are briefly illustrated first so as to introduce the solution according to the present disclosure in more details.

Random access may include a four-step random access (also referred to as a four-step random access channel, or, also referred to as a 4-step RACH, a contention based random access) and a two-step random access (also referred to as a two-step random access channel, or also referred to as a 2-step RACH, a non-contention based random access), while the random access involved in the embodiment of the present disclosure is mainly the two-step random access, for ease of understanding, 4-step RACH and 2-step RACH procedures will be described in detail below.

Figure 3:
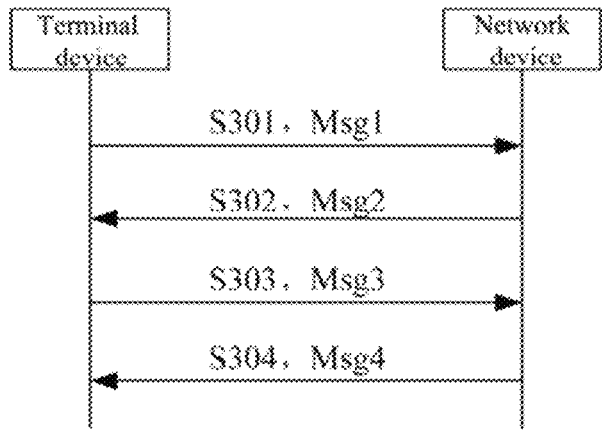
FIG. 3 is a schematic flow diagram of 4-step random access channel (RACH) according to an embodiment of the present disclosure.

FIG. 3 is a schematic flow chart of a 4-step RACH according to an embodiment of the present disclosure. The 4-step RACH has been defined in detail in an existing protocol TS38.300, and it is only briefly described in the present disclosure. Referring to FIG. 3, the method may include:

S301, a terminal device sends Msg1 to a network device. Msg1 may also be referred to as msg1 or MSG1.

Msg1 is used to transmit a random access preamble, and the random access preamble may also be referred to as a random access preamble sequence, or a preamble, or a preamble sequence.

In the embodiments of the present disclosure, the preamble and time-frequency resources occupied by transmission of the preamble are referred to as a physical random access channel (PRACH) resource.

Optionally, the terminal device may select a PRACH resource, and select a preamble, and send the selected preamble on the selected PRACH resource. If the random access manner is a non-contention based random access, the PRACH resource and preamble may be specified by a base station, and the base station may estimate, based on the preamble sent by the terminal device, a timing advance (TA) and a size of an uplink grant required for transmission of Msg3 by the terminal device.

For example, the network device may broadcast available PRACH resources through system information.

S302, the network device sends Msg2 to the terminal device.

Msg2 may also be referred to as msg2 or MSG2.

Msg2 contains time-frequency resources determined by the network device to be used by the terminal device to send a payload (payload).

After the terminal device sends Msg1, it is possible to open a random access response time window (ra-Response Window), and monitor within the random access response time window a physical downlink control channel (PDCCH) scrambled by a random access radio network temporary identifier (RA-RNTI).

The RA-RNTI is related to the PRACH time-frequency resources used by the terminal device to send Msg1.

After the terminal device successfully receives the PDCCH scrambled by the RA-RNTI, the terminal device can obtain a physical downlink shared channel (PDSCH) scheduled by the PDCCH, where a random access response (RAR) is included. The RAR may include the following information:

a back-off indicator (BI) contained in a sub-header of the RAR, which is used to indicate a back-off time for retransmitting Msg1;

a PRACH preamble identity (RAPID) in the RAR: a received preamble index responded by the network;

a timing advance group (TAG) included in the payload (payload) of the RAR, which is used to adjust uplink timing;

an uplink (UL) grant: which is used to schedule an uplink resource indicator of Msg3;

a temporary (temporary) cell radio network temporary identifier (C-RNTI): which is used to scramble the PDCCH of Msg4.

If the terminal receives the PDCCH scrambled by the RAR-RNTI, and the RAR contains the preamble index sent by the terminal, then the terminal considers that the random access response is successfully received.

For the non-contention based random access, after the terminal successfully receives Msg2, the random access procedure ends. For the contention based random access, after the terminal device successfully receives Msg2, it proceeds to transmit Msg3 and receive Msg4.

S303, the terminal device sends Msg3 to the network device.

Msg3 may also be referred to as msg3, or MSG3.

Msg3 is a first scheduling transmission in the random access procedure, and the payload (payload) is sent, for example, an RRC connection request message, tracking area update message, and so on.

Msg3 may notify the network device what event triggers the RACH procedure. For example, in case of an initial access random procedure, Msg3 will carry a UE ID and an establishment cause (establishment cause); in case of an RRC reestablishment, Msg3 will carry a connected UE identifier and an establishment cause (establishment cause).

It should be noted that if different terminal devices select a same preamble in S301 and send the preamble on a same time-frequency resource, the different terminal devices send the payload on the same time-frequency resource, which lead to a resource use conflict.

S304, the network device sends Msg4 to the terminal device.

Msg4 may also be referred to is msg4, or MSG4.

Msg4 is used to indicate whether the terminal device successfully accesses the network device.

Msg4 may have the following two functions: one is to resolve a contention conflict. The other is for the network device to transmit an RRC configuration message to the terminal device. There are two ways to resolve the contention conflict: one is that if the terminal device carries a C-RNTI in Msg3, then Msg4 is scheduled using the PDCCH scrambled by the C-RNTI. The other is that if the terminal device does not carry a C-RNTI in Msg3, such as an initial access, Msg4 is scheduled using the PDCCH scrambled by a TC-RNTI. The conflict resolution lies in the terminal device receiving a PDSCH of Msg4 and matching a common control channel (CCCH) service data unit (SDU) in the PDSCH.

Figure 4:
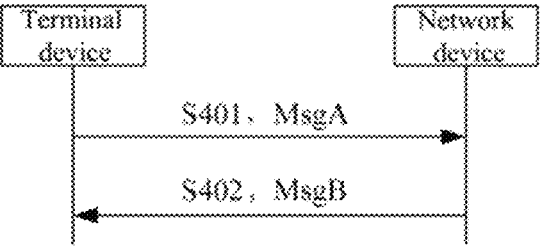
FIG. 4 is a schematic flow diagram of 2-step RACH according to an embodiment of the present disclosure.

FIG. 4 is a schematic now chart of a 2-step RACH according to an embodiment of the present disclosure. Referring to FIG. 4, the method may include:

S401, a terminal device sends MsgA to a network device.

MsgA may also be referred to as msgA, or MSGA.

The msgA includes a preamble and a payload (for example, an RRC connection request message, a tracking area update message, etc.).

S402, the network device sends msgB to the terminal device.

The msgB may also be referred to as MsgB or MSGB, and is used to indicate whether the terminal device has successfully accessed the network device.

It may be seen from the above random access procedure that a random access is mainly targeted at obtaining uplink synchronization between the terminal device and the network device (cell).

On the basis of the content introduced above, the technical solutions shown in the present disclosure will be described in detail below through specific embodiments. It should be noted that the following embodiments may exist independently or may be combined with each other, and the same or similar content will not be repeated in different embodiments.

Figure 5:
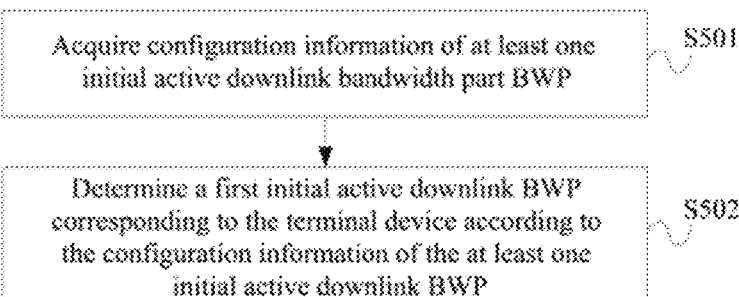
FIG. 5 is a first flowchart of a communication method according to an embodiment of the present disclosure.

A communication method on a terminal device side according to the embodiment of the present disclosure will be introduced below with reference to FIG. 5. FIG. 5 is a first flowchart of the communication method according to the embodiment of the present disclosure.

As shown in FIG. 5, the method includes:

S501, acquire configuration information of at least one initial active downlink bandwidth part BWP.

In the embodiment, the configuration information of the initial active downlink BWP may include, for example, a bandwidth size, a frequency band position, and subcarrier spacing of the initial active downlink BWP, or may include information related to the initial active downlink BWP according to actual requirements, such as a paging period, etc. Implementations of the configuration information will not be limited in the embodiment.

In a possible implementation, the terminal device may receive, for example, a system broadcast message from a network device, where the system broadcast message includes the configuration information of the at least one initial active downlink bandwidth part BWP, and then the terminal device may acquire the configuration information of the at least one initial active downlink BWP according to the system broadcast message.

The system broadcast message may be, for example, an RMSI, or other system information (OSI). By taking an example where the system broadcast message is the RMSI, brief introduction is made hereunder to an implementation for the terminal device to acquire the configuration information. The terminal device may perform a cell search when initial access is required, for example, an SSB may be searched by the terminal device, where the SSB corresponds to RMSI, and the RMSI is used to indicate the configuration information of the at least one initial active downlink bandwidth part BWP, then the terminal device may acquire the configuration information of the at least one initial active downlink bandwidth put BWP.

Or, in another possible implementation, the terminal device and the network device may also, for example, predetermine the configuration information of the at least one initial active downlink bandwidth part BWP, then the terminal device may acquire the configuration information of the at least one initial active downlink BWP locally. The implementation of acquiring the configuration information of the at least one initial active downlink BWP will not be limited in the embodiment, which may be selected according to actual requirements.

It may be understood by those skilled in the art that, the configuration information of each initial active downlink BWP is individually configured by the network device, and the configuration information may be different from each other, or may be partially different, which is not limited in the embodiment.

S502, determine a first initial active downlink BWP corresponding to the terminal device according to the configuration information of the at least one initial active downlink BWP.

It may be understood that different terminal devices have different characteristics, so different terminal devices have different requirements for the initial active downlink bandwidth part BWP.

In the embodiment, the terminal device may determine, according to its own requirements, the first initial active downlink BWP corresponding to the terminal device from the at least one initial active downlink BWP.

The first initial active downlink BWP is used for the terminal device to receive first information, where the first information includes at least one of the following: system information, a paging message, and a downlink signal in a random access procedure.

In a possible implementation, the terminal device may determine the first initial active downlink BWP from the at least one initial active downlink BWP, according to attribute information of the terminal device and the configuration information of the at least one initial active downlink BWP.

The attribute information of the terminal device includes at least one of the following: device identification, an access level, a service type, a terminal bandwidth, a number of antennas and/or a number of antenna ports, or a power consumption mode.

That is to say, the terminal device may select, according to us actual requirements, a desired first initial active downlink BWP from the at least one initial active downlink BWP, thereby avoiding a problem of low communication efficiency caused by the same initial active downlink BWP of each terminal device.

The communication method according to the embodiment of the present disclosure includes: acquiring configuration information of least one initial active downlink bandwidth part BWP; and determining a first initial active downlink BWP corresponding to a terminal device according to the configuration information of the at least one initial active downlink BWP. A terminal device determines a first initial active downlink BWP corresponding to the terminal device according to configuration information of at least one initial active downlink BWP, so as to ensure that each terminal device selects an initial active downlink BWP according to its actual requirements, thereby avoiding a problem of low communication efficiency caused by the same initial active downlink BWP of each terminal device.

On the basis of the above embodiment, the configuration information of the initial active downlink BWP is briefly introduced in the following.

The configuration information of the initial active downlink BWP may include at least one of the following: a bandwidth site, a frequency band position, or subcarrier spacing.

The configuration information may be different in terms of respective items; or, the configuration information may be partially the same and partially different in terms of respective items. It may be understood that there is no inevitable connection between configuration information of respective initial active downlink BWPs, and the network device may perform setting according to actual requirements.

And, the number of the initial active downlink BWPs configured by the network device may be implemented according to the current number of terminal devices, and/or the power consumption mode of the terminal device, and/or the service requirements of the terminal device, which will not be particularly limited in the embodiment.)

Figure 6:
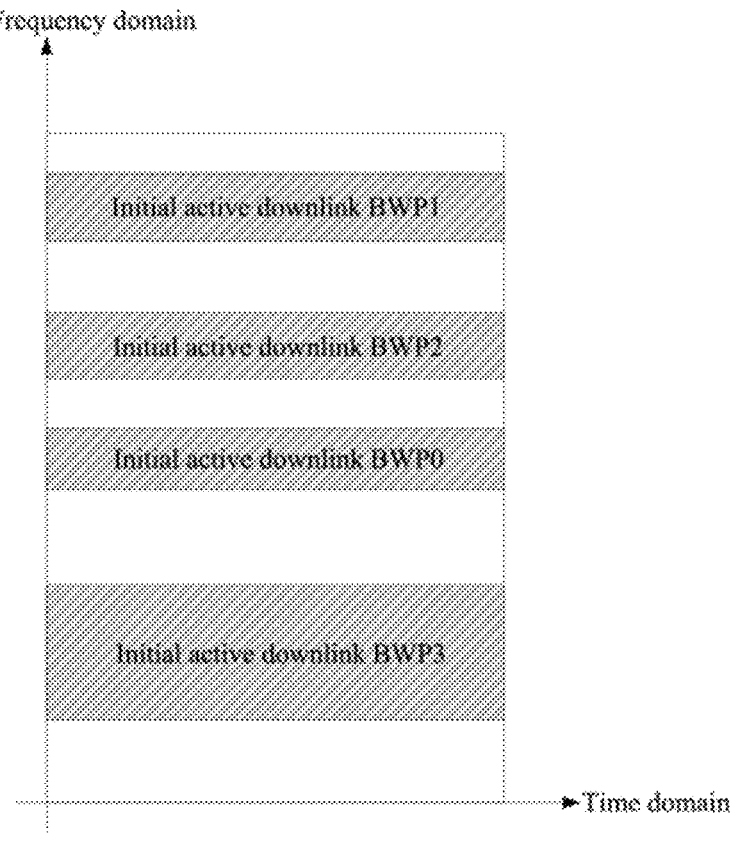
FIG. 6 is a possible schematic diagram of at least one initial active downlink BWP according to an embodiment of the present disclosure.

A possible implementation of at least one initial active downlink BWP will be described below with reference to FIG. 6. FIG. 6 is a possible schematic diagram of the at least one initial active downlink BWP according, to an embodiment of the present disclosure, as shown in FIG. 6:

in order to accomplish an initial access procedure for terminal devices with different requirements and to meet initial access requirements of a large number of terminals, a network device may be configured, for example, with 4 initial active downlink BWPs, as shown in FIG. 6, the 4 initial active downlink BWPs are respectively an initial active downlink BWP1, an initial active downlink BWP2, initial active downlink BWP0 and an initial active downlink BWP3.

The frequency band positions of the 4 initial active downlink BWPs are different from each other; moreover, the initial active downlink BWP1, the initial active downlink BWP2 and the initial active downlink BWP0 have a same bandwidth size, while the bandwidth size of the initial active downlink BWP1 the initial active downlink BWP2 and the initial active downlink BWP0 is different from the bandwidth size of the initial active downlink BWP3; similarly, the 4 initial active downlink BWPs may be different from each other or may be partially the same in terms of subcarrier spacing, which is not limited in the embodiment and may be selected based on actual requirements.)

Several possible situations in which different configuration information corresponds to different terminal devices will be illustrated below.

An initial active downlink BWP with a different bandwidth size may be targeted for a terminal device with a different bandwidth size, for example, a terminal device with a bandwidth size of 5 MHz may be configured with an initial active downlink BWP with a bandwidth size less than 5 MHz, for another example, a terminal device with a bandwidth size of 10 MHz may be configured with an initial active downlink BWP with a bandwidth size less than 10 MHz.

Multiple initial active downlink BWPs at different frequency band positions may be used to promote the number of terminal devices that perform initial access at the same time, for example, different terminal devices may be dispersed into different initial active downlink BWPs according to certain rules to avoid a system congestion caused by an initial access procedure when the number of terminal devices is large.

Different subcarrier spacing can meet requirements of flexible configuration of a system, for example, for a terminal device having a requirement for a short access delay, the network device may configure an initial active downlink BWP with larger subcarrier spacing.

On the basis of the content introduced above, based on different requirements, the network device may configure multiple initial active downlink BWPs to correspond to different terminal devices. Several possible implementations for the terminal device to determine the first initial active downlink BWP under several different requirements will be illustrated with reference to specific embodiments in the following.

Case 1: Corresponding to a Requirement for System Capacity Expansion in an Initial Access Procedure Specifically, multiple initial active downlink BWPs may correspond to different terminal devices, that is to say, a terminal device may determine a first initial active downlink BWP corresponding thereto based on certain rules, so that an initial access procedure is performed in the first initial active downlink BWP. The terminal device determines the first initial active downlink BWP corresponding thereto, so that different terminal devices can be dispersed into different initial active downlink BWPs to effectively prevent a problem of an insufficient system capacity during initial access caused by a narrow initial active downlink BWP resulting from a narrow terminal bandwidth of the terminal device, which can effectively achieve the requirement for system capacity expansion.

Several possible implementations included in the requirement for system capacity expansion in the initial access procedure will be illustrated in the following.

In a possible implementation, the attribute information of the terminal device is the device identification of the terminal device, and the configuration information of the initial active downlink BWP further includes a number of the initial active downlink BWP.

The device identification of the terminal device may be, for example, an identification of a subscriber identity module (SIM) card of the terminal device, or, the identification of the terminal device may also be, for example, a preset digital identification of the terminal device, for example, it may be 1, 2, 3, 4, etc., the specific implementation of the device identification of the terminal device is not limited in the embodiment, as long as the device identification of the terminal device can uniquely indicate one terminal device.

And, the number of the initial active downlink BWP in the embodiment may be, for example, 0, 1, 2, 3, etc., as described in the above embodiment, or may be any other number, which is not limited in the embodiment. Those skilled in the art may understand that the device identification of the terminal device and the number of the initial active downlink BWP in the present disclosure are numerals, and according to actual requirements, other possible implementations may be obtained upon expanding.

In the implementation, the number of the first initial active downlink BWP is the same as a first result, where the first result is a result obtained by performing a modulo operation between the device identification of the terminal device and a first number, where the first number is a current number of initial active downlink BWPs.

Figure 7:
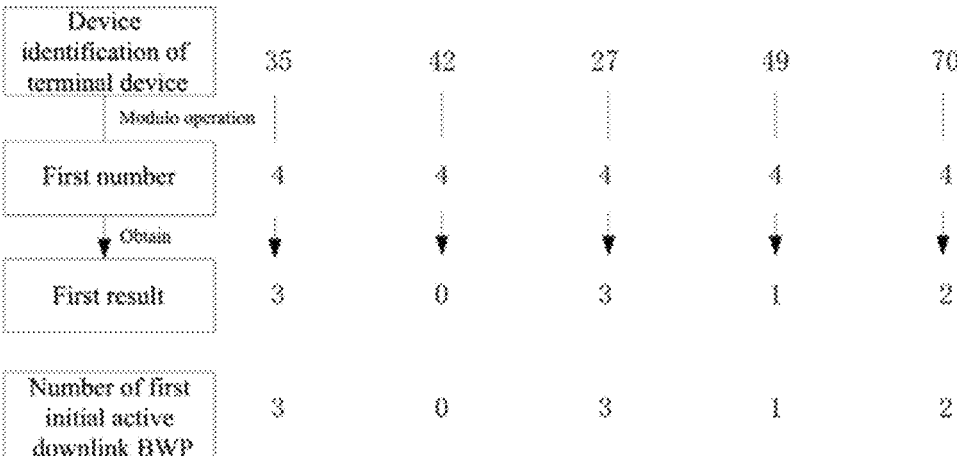
FIG. 7 is a possible schematic diagram of determining a first initial active downlink BWP according to an embodiment of the present disclosure.

The current implementation will be illustrated below with reference to FIG. 7. FIG. 7 is a possible schematic diagram of determining a first initial active downlink BWP according to an embodiment of the present disclosure, as shown in FIG. 7:

assuming that there are currently 5 terminal devices, they respectively correspond to device identifications of 35, 42, 27, 49 and 70; and assuming that there are currently 4 initial active downlink BWPs, they are respectively numbered as 0, 2 and 3, thus, the first number is 4.

Taking the terminal device 35 as an example, the terminal device performs a modulo operation according to the identification of the terminal device and the first number to obtain a first result, then the first result obtained by performing a modulo operation between 35 and 4 is 3, and then the terminal device determines the first initial active downlink BWP from the at least one initial active downlink BWP according to the first result, where the number of the first initial active downlink BWP is the same as the first result, that is, the first initial active downlink BWP corresponding to the terminal device 35 is the initial active downlink BWP numbered 3.

Correspondingly, the remaining terminal devices may also determine respective first initial active downlink BWP numbers corresponding thereto according to the above process, and a final result is shown as numbers in FIG. 7.

Figures 8, 9:
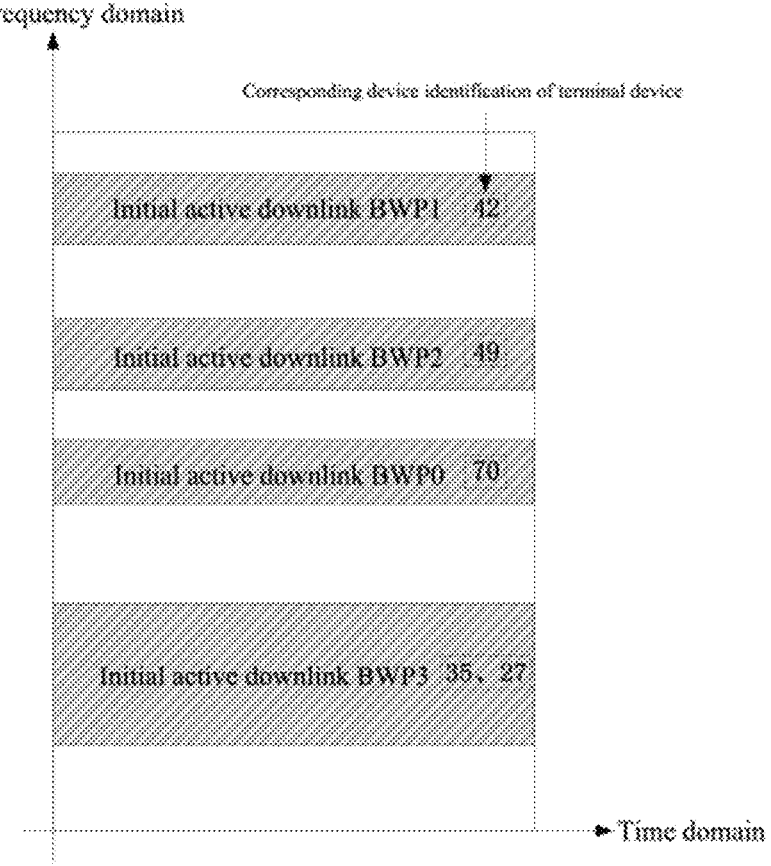
FIG. 8 is a schematic diagram of a corresponding relationship between a terminal device and an initial active downlink BWP according to an embodiment of the present disclosure.
FIG. 9 is a schematic diagram of a possible implementation of a first corresponding relationship according to an embodiment of the present disclosure.

After determining the number of the first initial active downlink BWP corresponding to each terminal device, in the example of FIG. 7, the device identification of the terminal device corresponding to each initial active downlink BWP is as shown in FIG. 8. FIG. 8 is a schematic diagram of a corresponding relationship between the terminal device and the initial active downlink BWP according to an embodiment of the present disclosure.

It may be seen from FIG. 8 that different terminal devices are dispersed into different initial active downlink BWPs.

Those skilled in the art may understand that, a device identification of the terminal device, a number of the initial active downlink BWP, and a first number shown in FIG. 7 and FIG. 8 are all exemplary representations, in an actual implementation process, the device identification, the number and the first number all may be selected according to actual requirements, which is not particularly limited in the embodiment.

By determining the first initial active downlink BWP corresponding to the terminal device according to the device identification of the terminal device and the number of the initial active downlink BWP, each terminal device may be dispersed into different initial active downlink BWPs to perform an initial access procedure, thereby the objective of system capacity expansion can be effectively achieved.

In another possible implementation, the attribute information of the terminal device is a UE access level of the terminal device, and the configuration information of the initial active downlink BWP further includes a number of the initial active downlink BWP.

The UE access level of the terminal device refers to a priority for the terminal device to access a network, where the UE access level may be assigned to the user by an operator, for example, a SIM card is set with a priority for network access when it leaves the factory, when the system capacity is limited, a terminal device corresponding to a high-priority SIM card may access the network first.

In the implementation, the number of the first initial active downlink BWP is the same as a second result, where the second result is a result obtained by performing a modulo operation between the access level of the terminal device and a first number, where the first number is a current number of initial active downlink BWPs.

The terminal device performs the modulo operation according to the access level of the terminal device and the first number to obtain the second result, and then the terminal device determines the first initial active downlink BWP from the at least one initial active downlink BWP according to the second result, where the number of the first initial active downlink BWP is the same as the second result.

It may be understood that the current implementation is similar to the implementation of the device identification of the terminal device introduced above, the difference is that the second result in the embodiment is obtained by performing a modulo operation between the access level of the terminal device and the first number, reference may be made to the introduction in the above embodiment for a specific implementation, which will not be repeated this time.

By determining the first initial active downlink BWP corresponding to the terminal device according to the access level of the terminal device and the number of the initial active downlink BWP, each terminal device may be dispersed into different initial active downlink BWPs to perform an initial access procedure, thereby the objective of system capacity expansion can be effectively achieved.

In another possible implementation, the attribute information of the terminal device is the UE access level of the terminal device.

Then, the implementation of determining the first initial active downlink BWP according to the attribute information of the terminal device and the configuration information of the at least one initial active downlink BWP may include:

acquiring a first corresponding relationship, where the first corresponding relationship is used to indicate a corresponding relationship between the access level and the initial active downlink BWP; and determining the first initial active downlink BWP corresponding to the access level of the terminal device from the at least one initial active downlink BWP, according to the first corresponding relationship and the access level of the terminal device.

A possible implementation of the first corresponding relationship will be illustrated with reference to FIG. 9 in the following. FIG. 9 is a schematic diagram of a possible implementation of a first corresponding relationship according to an embodiment of the present disclosure.

Referring to FIG. 9, assume that there are currently 3 initial active downlink BWPs, namely an initial active downlink BWP0, an initial active downlink BWP1 and an initial active downlink BWP2, where the access levels of the terminal device corresponding to the initial active downlink BWP0 are level 1 and level 2, and the access levels of the terminal device corresponding to the initial active downlink BWP1 are level 3, level 4 and level 5, and the access level of the terminal device corresponding to the initial active downlink BWP2 is level 6.

In the embodiment, the first corresponding relationship may be, for example, configured by the network device to the terminal device, or, the first corresponding relationship may be preset between the network device and the terminal device.

Then the terminal device may determine the first initial active downlink BWP corresponding to the access level of the terminal device according to the first corresponding relationship and its own access level. Referring to FIG. 9, assume that the current access level of the terminal device is level 4, the first initial active downlink BWP corresponding to the terminal device is the initial active downlink BWP.

It should be noted that the first corresponding relationship in FIG. 9 is only an exemplary illustration, and is not a limitation on the first corresponding relationship. In an actual implementation process, an implementation of the first corresponding relationship may be selected according to actual requirements, where the initial active downlink BWP may be indicated by a number, or, may be indicated by a BWP identification of the initial active downlink BWP, which is not particularly limited in the embodiment.

By determining the first initial active downlink BWP corresponding to the terminal device according to the access level of the terminal device and the first corresponding relationship, each terminal device may be dispersed into different initial active downlink BWPs to perform an initial access procedure, thereby the objective of system capacity expansion can be effectively achieved.

In yet another possible implementation, the attribute information of the terminal device is a service type of the terminal device.

Then, the implementation of determining the first initial active downlink BWP according to the attribute information of the terminal device and the configuration information of the at least one initial active downlink BWP may Include:

acquiring a second corresponding relationship, where the second corresponding relationship is used to indicate a corresponding relationship between the service type and the initial ac live downlink BWP; and determining the first initial active downlink BWP corresponding to the service type of the terminal device from the at least one initial active downlink BWP, according to the second corresponding relationship and the service type of the terminal device.

The service type of the terminal device may include, for example, a voice service, a data stream service, a web browsing service, a video download service, etc., an implementation of the service type of the terminal device is not limited in the embodiment. The service type of the terminal device may be classified with reference to the implementation in the prior art, which will not be repeated this time.

Figures 10, 11:
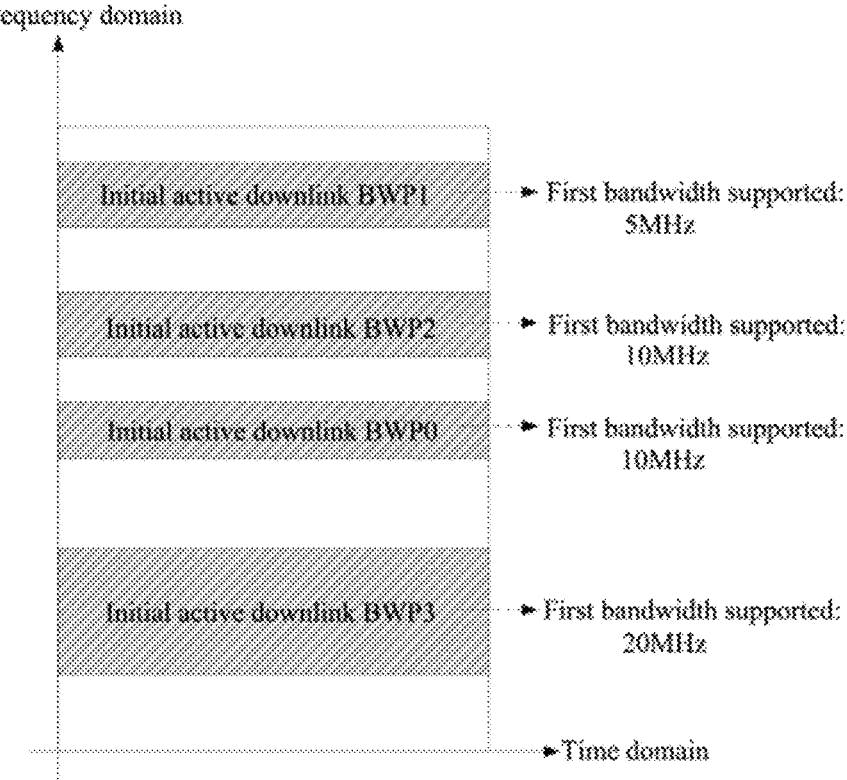
FIG. 10 is a schematic diagram of a possible implementation of a second corresponding relationship according to an embodiment of the present disclosure.
FIG. 11 is a schematic diagram of a first bandwidth according to an embodiment of the present disclosure.

A possible implementation of the second corresponding relationship with reference to FIG. 10 in the following. FIG. 10 is a schematic diagram of a possible implementation of the second corresponding relationship according to an embodiment of the present disclosure.

Referring to FIG. 10, assume that 3 initial active downlink BWPs are currently configured, respectively are an initial active downlink BWP0, an initial active downlink BWP1, and an initial active downlink BWP2. The service type of the terminal device corresponding to the initial active downlink BWP0 is a voice service, and the service type corresponding to the initial act iv downlink BWP1 is a data stream service, and the service type of the terminal device corresponding to be initial active downlink BWP2 is a web browsing service.

Then the terminal device may determine the first initial active downlink. BWP corresponding to the service type of the terminal device according to the second corresponding relationship and its own service type. Referring to FIG. 10, assume that the current service type of the terminal device is the voice service, the first initial active downlink BWP corresponding to the terminal device is the initial active downlink BWP0.

It should be noted that the second corresponding relationship in FIG. 10 is only an exemplary illustration, and is not a limitation on the second corresponding relationship. In an actual implementation process, an implementation of the second corresponding relationship may be selected according to actual requirements, where the initial active downlink BWP may be indicated by a number, or, may be indicated by a BWP identification of the initial active downlink BWP, which is not particularly limited in the embodiment.

By determining the first initial active downlink BWP corresponding to the terminal device according to the service type of the terminal device and the second corresponding relationship, each terminal device may be dispersed into different initial active downlink BWPs to perform an initial access procedure, thereby the objective of system capacity expansion can be effectively achieved.

The four possible implementations introduced above may all effectively achieve the terminal device being dispersed into different initial active downlink BWPs, so as to achieve the initial access procedure on different bandwidth parts, thereby requirements of system capacity expansion can be effectively achieved.

On the basis of the above embodiments, several possible implementations of requirements for supporting terminal devices with different terminal bandwidths are illustrated below.

Case 2: Corresponding to Requirements for Supporting Terminal Devices with Different Terminal Bandwidths A network device may configure multiple initial active downlink BWPs to correspond to different terminal devices so as to support terminal devices with different terminal bandwidth sizes, so that different terminal devices may not affect each other in terms of an initial access procedure therebetween, due to different terminal bandwidth sizes. For example, a terminal device with a relatively large terminal bandwidth may use a relatively large initial active downlink BWP to complete the initial access, thereby speeding up the initial access procedure.

In a possible implementation, the attribute information of the terminal device is the terminal bandwidth of the terminal device, and the configuration information of the first initial active downlink BWP further includes a first bandwidth supported by the first initial active downlink BWP.

The terminal bandwidth refers to a bandwidth supported by the terminal device. In the embodiment, the terminal bandwidth is equal to the first bandwidth, which may be interpreted as the bandwidth size of the terminal bandwidth being equal to the bandwidth size of the first bandwidth.

The first bandwidth will be illustrated below with reference to FIG. 11. FIG. 11 is a schematic diagram of the first bandwidth according to an embodiment of the present disclosure.

In the embodiment, the configuration information of the first initial active downlink BWP includes the first bandwidth supported by the first initial active downlink BWP, that is to say, allowing a terminal device with a certain terminal bandwidth to use the first initial active downlink BWP, refer to FIG. 11, assume that an initial active downlink BWP0, an initial active downlink BWP1, an initial active downlink BWP2 and an initial active downlink BWP3 are currently configured, and they correspond to supported bandwidths of 10 MHz, 5 MHz, 10 MHz and 20 MHz, respectively.

Correspondingly, the terminal device with a terminal bandwidth of 5 MHz may receive information in the initial access procedure on the initial active downlink BWP1; the terminal device with a terminal bandwidth of 10 MHz may only use the initial active downlink BWP0 or the initial active downlink BWP2 to receive information, but cannot use the initial active downlink BWP1 to receive information.

By determining the first initial active downlink. BWP corresponding to the terminal device according to the terminal bandwidth of the terminal device and the bandwidth supported by the initial active downlink BWP, it is possible to effectively achieve configuration of multiple initial active downlink BWPs to correspond to different terminal devices so as to support terminal devices with different terminal bandwidth sizes, so that different terminal devices may not affect each other in terms of an initial access procedure between, due to different terminal bandwidth sizes.

In another possible implementation, the attribute information of the terminal device is the terminal bandwidth of the terminal device.

In the embodiment, the bandwidth size of the first initial active downlink BWP is less than or equal to the terminal bandwidth of the terminal device.

That is to say, the terminal device determines, according to the terminal bandwidth, which one of the at least one initial active downlink BWP is used as the first initial active downlink BWP for its own use, for example, the terminal device may select an initial active downlink BWP, whose bandwidth size is not greater than the bandwidth size of the terminal bandwidth, as the first initial active downlink BWP for its own use.

The implementation of determining the first initial active downlink BWP according to the terminal bandwidth of the terminal device and the bandwidth size of the initial active downlink BWP will be exemplarily introduced with reference to FIG. 12. FIG. 12 is a schematic diagram of a size of a bandwidth of an initial active downlink BWP according to an embodiment of the present disclosure.

As shown in FIG. 12, assuming that 4 initial active downlink BWPs are currently configured, respectively are an initial active downlink BWP0, an initial active downlink BWP1, an initial active downlink BWP2 and an initial active downlink BWP3, they correspond to bandwidth sizes of 2 MHz, 3 MHz, 2 MHz and 4 MHz respectively, as shown in FIG. 12.

Assuming that the current terminal bandwidth of the terminal device is 5 MHz, the terminal device needs to select, from the 4 initial active downlink BWPs, an initial active downlink BWP with a bandwidth size less than or equal to 5 MHz as the first initial active downlink BWP. It can be determined that the 4 initial active downlink BWPs in FIG. 12 all meet this condition with reference to FIG. 12, then, when there are multiple initial active downlink BWPs whose bandwidth size is less than or equal to the terminal bandwidth of the terminal device, the terminal device needs to perform a selection among the multiple initial active downlink BWPs.

In a possible implementation, the terminal device may select an initial active downlink BWP, whose bandwidth size is closest to the terminal bandwidth, as the first initial active downlink BWP, that is to say, the bandwidth size of the first initial active downlink BWP is from a bandwidth size of each initial active downlink BWP that has a smallest difference with the bandwidth size of the terminal bandwidth.

Then in the example in FIG. 12, the first initial active downlink BWP determined by the terminal device is the initial active downlink. BWP3 with a bandwidth of 4 MHz, since the difference between 4 MHz and 5 MHz is the smallest.

Or, the terminal device may randomly select one from multiple initial active downlink BWPs that meet the above bandwidth conditions.

The implementation for the terminal device to select the first initial active downlink BWP from the multiple initial active downlink BWPs that meet the conditions is not limited in the embodiment, as long as the terminal device can select one.

By determining the first initial active downlink BWP corresponding to the terminal device according to the terminal bandwidth of the terminal device and the bandwidth size of the initial active downlink BWP, it is possible to effectively achieve configuration of multiple initial active downlink BWPs to correspond to different terminal devices so as to support terminal devices with different terminal bandwidth sizes, so that different terminal devices may not affect each other in terms of an initial access procedure therebetween, due to different terminal bandwidth sizes.

On the basis of the above embodiments, several possible implementations of requirements for supporting terminal devices with different numbers of antennas are illustrated below:

Case 3: Corresponding to Requirements for Supporting Different Numbers of Antennas and/or Numbers of Antenna Ports A network device may configure multiple initial active downlink. BWPs to respectively correspond to different terminal devices so as to support terminal devices with different numbers of antennas and/or numbers of antenna ports.

By configuring multiple initial active downlink BWPs to support terminal devices with different numbers of antennas and/or numbers of antenna ports, the network device is enabled to set optimal downlink data transmission in different initial active downlink BWPs for devices with different numbers of antennas, for example, for terminal devices each with 4 receivers (Rx), a relatively high modulation and coding scheme (MCS) may be adopted; for terminal devices each with 1Rx, a relatively low MCS may be adopted to ensure coverage performance of these terminals.

In a possible implementation, the attribute information of the terminal device is the number of antennas and/or the number of antenna ports, and the configuration information further includes a number of first antennas and/or a number of first antenna ports of the terminal device supported by the first initial active downlink BWP.

In the embodiment, a number of terminal antennas of the terminal device is the same as the number of first antennas; and/or a number of terminal antenna ports of the terminal device is the same as the number of first antenna, ports.

An implementation of the number of terminal antennas of the terminal device is similar to the implementation of the terminal bandwidth of the terminal device introduced above, and will not be repeated this time.

By determining the first initial active downlink BWP corresponding to the terminal device according to the number of antennas and/or the number of antenna ports of the terminal device and the number of first antennas of the terminal device and/or the number of first antenna ports of the terminal device supported by the initial active downlink. BWP, it is possible to effectively achieve setting of the optimal downlink data transmission in different initial active downlink BWPs for terminal devices with different numbers of antennas.

In another possible implementation, the attribute information of the terminal device is the number of antennas and/or the number of antenna ports, and the configuration information further includes the number of first antennas and/or the number of first antenna ports of the terminal device supported by the first initial active downlink BWP.

In the embodiment, the number of first antennas is less than or equal to the number of terminal antennas of the terminal device; and/or the number of first antenna ports is less than or equal to the number of terminal antenna ports of the terminal device.

The coverage with regard to the number of antennas and/or the number of antenna ports needs to be illustrated here, taking the number of antennas as an example, it may be understood that the less the number of antennas, the stronger the coverage capacity of a corresponding cell. It is assumed that the number of first antennas of the terminal device currently supported by the first initial active downlink BWP is 4 antennas, then when the network device transmits data through the first initial active downlink BWP, the terminal device with 2 antennas may not be able to receive all information sent by the network device, so that the coverage performance will be affected.

Therefore, in the embodiment, it is provided that the number of first antennas is less than or equal to the number of terminal antennas of the terminal device; and/or the number of first antenna ports is less than or equal to the number of terminal antenna ports of the terminal device, so that cell coverage can be effectively ensured.

To illustrate with an example, assuming that the current number of terminal antennas of the terminal device is 4, the terminal device needs to select from the at least one initial active downlink BWP an initial active downlink BWP, with the number of antennas less than or equal to 4 as the first initial active downlink BWP. It may be understood that, when there are multiple initial active downlink BWPs whose numbers of antennas are less than or equal to the number of antennas of the terminal device, the terminal device needs to perform a selection among the multiple initial active downlink BWPs.

In a possible implementation, the terminal device may select a corresponding initial active downlink BWP with the number of first antennas closest to the number of terminal antennas as the first initial active downlink BWP, that is to say, the number of first antennas corresponding to the first initial active downlink BWP is from a number of first antennas of each initial active downlink BWP that has a smallest difference with the number of terminal antennas of the terminal device.

Or, the terminal device may randomly select one from multiple initial active downlink BWPs that meet the above number of antennas and/or the number of antenna ports.

The implementation for the terminal device to select the first initial active downlink BWP from the multiple initial active downlink BWPs that meet the conditions is not limited in the embodiment, as long as the terminal device can select one.

By determining the first initial active downlink BWP corresponding to the terminal device according to the number of terminal antennas and/or the number of terminal antenna ports of the terminal device and the number of first antennas and/or the number of first antenna pons of the terminal device supported by the initial active downlink BWP, it is possible to effectively achieve setting of optimal downlink data transmission in different initial active downlink BWPs for terminal devices with different numbers of antennas.

On the basis of the above embodiments, several possible implementations for supporting terminal devices with different power consumption requirements are illustrated below.

Case 4: Corresponding to Requirements for Supporting Terminal Devices with Different Power Consumption Requirements Some terminal devices require relatively low power consumption, but are relatively insensitive to service delay, such as some monitoring-type Internet of Things devices; some terminal devices do not have strict requirements on power consumption, but have relatively strict requirements for service delay, so terminal devices of different power consumption types may be configured with different initial active downlink BWPs.

For terminal devices that have requirements on energy saving, one initial active downlink BWP may be configured, so that configuration related to initial access in the initial active downlink BWP is more conducive to energy saving, such as a relatively long paging period;

For terminal devices that have no requirement on energy saving, another initial active downlink BWP may be configured, so that configuration related to initial access in the initial active downlink BWP is more conducive to reducing the access delay, such as configuration of a relatively short paging period.

By configuring different initial active downlink BWPs for terminal devices with different power consumption and service requirements, the requirements of corresponding terminal devices can be met.

In a possible implementation, the attribute information of the terminal device is a power consumption mode of the terminal device, and the configuration information may also include a paging period.

The power consumption mode may include, for example, a high power consumption mode and a low power consumption mode. Then, for example, a paging period of the first initial active downlink BWP corresponding to the terminal device in the high power consumption mode may be set to be smaller than a paging period of the first initial active downlink BWP corresponding to the terminal device in the low power consumption mode.

Specific settings of the relatively long paging period and the relatively short paging period may be configured by the network device, which is not particularly limited in the embodiment.

Or, in an implementation, the power consumption mode may also include a high power consumption mode, a medium power consumption mode, a low power consumption mode and a normal power consumption mode according to actual requirements, or there may be other divisions, which will not be repeated this time.

And, the paging period of the initial active downlink BWP corresponding to the terminal device of various power consumption modes only needs to follow the following principles: the lower the power consumption corresponding to the power consumption mode, the longer the paging period, and the other possible implementations may be expanded according to actual requirements, which will not be repeated this time.

By configuring different initial active downlink BWPs for terminal devices with different power consumption and service requirements, it is possible to meet requirements of corresponding terminal devices and ensure that different terminal devices may correspond to their respective adaptive initial active downlink BWPs, thereby improving the communication efficiency.

On the basis of the above embodiments, those skilled in the art may understand that, the at least one initial active downlink BWP configured by the network device to an NR-light terminal device may include the initial active downlink. BWP configured for an existing normal NR terminal device, that is to say, some NR-light terminal devices may adopt the initial active downlink BWP configured for the existing normal NR terminal device, where specific corresponding relationships may refer to introductions in the above embodiments, which will not be repeated this time.

On the basis of the above embodiments, a CSS configuration of the at least one initial active downlink BWP will be introduced in the following.

In the present disclosure, the at least one initial active downlink BWP configured for the NR-light terminal device may be used for the terminal device to receive paging messages, and/or receive system broadcast messages, and/or receive downlink messages in a random access procedure (such as RAR messages and conflict resolution messages in the random access procedure), etc.

In the at least one initial active downlink BWP, the terminal device receives a PDCCH for scheduling the above messages, specifically in the CSS.

In the embodiment, the network device may configure common search space CSS configuration of the at least one initial active downlink BWP, the CSS configuration of the at least one initial active downlink BWP will be illustrated in the following.

The terminal device may perform a cell search when initial access is required, for example, an SSB may be searched by the terminal device, where the SSB corresponds to RMSI, and the terminal device may determine one initial active downlink BWP according to the RMSI, where the initial active downlink BWP determined according to the RMSI corresponds to a first PDCCH search space, where the first PDCCH search space may include, for example, type 0 PDCCH search space, type 0A PDCCH search space, type 1 PDCCH search space, and type 2 PDCCH search space.

The RMSI further used to indicate the configuration information of the at least one initial active downlink bandwidth part BWP, where each initial active downlink bandwidth part BWP indicated by the RMSI corresponds to a respective second PDCCH search space.

In the embodiment, the second PDCCH search space may be the same as or different from the first PDCCH search space.

And, in the embodiment, a PDCCH CORESET associated with the first PDCCH search space and a PDCCH CORESET associated with the second PDCCH search space may be the same or different.

On the basis of the foregoing embodiment, configuration of synchronization signals of the at least one initial active downlink BWP will be illustrated below.

When the network device is configured with the at least one initial active downlink BWP, some of the initial active downlink BWPs or all of the initial active downlink BWPs may be configured with synchronization signals when a synchronization signal is configured on an initial active downlink BWP, the terminal device may perform downlink time-frequency synchronization in the initial active downlink BWP.

The synchronization signal may be an SS/PBCH block, or may be a channel state information reference signal CST-RS.

In a possible case, when the synchronization signal is configured on the initial active downlink BWP, in a possible implementation, the SS/PBCH block may be on a non-synchronous raster when the synchronization signal is the SS/PBCH block, where when the SS/PBCH block may be on the non-synchronous raster, it is possible to effectively prevent other terminal device from searching the SS/PBCH block during a cell search, so as to avoid unnecessary waste of power consumption of the terminal device, thereby improving system efficiency.

Or, when the synchronization signal is the SS/PBCH block, the SS/PBCH block may also be on a synchronous raster (sync-raster), which may also achieve the solution of the present disclosure.

In another possible case, when no synchronization signal is configured on the initial active downlink BWP, the terminal device may be tuned to the initial active downlink BWP determined be based on an existing mechanism (by RMSI CORESET), and complete synchronization based on the SS/PBCH block in the initial active downlink BWP determined by the existing mechanism, when no synchronization signal is found on the current initial active downlink BWP by the terminal device in a need to perform synchronization.

In summary, according to the communication method provided in the embodiments of the present disclosure, different initial active downlink BWPs may be configured for different terminal devices, thereby meeting a requirement of increasing an initial access capacity of the system, or meeting data transmission requirements corresponding to capabilities or characteristics of different terminal devices, thereby optimizing system performance.

On the basis of the above embodiments, the terminal device receives any one of system information, paging messages, and downlink signals in the random access procedure through the first initial active downlink BWP, where the terminal device acquiring the configuration information of the at least one initial active downlink bandwidth part BWP may be performed based on the following process:

the terminal device performs a cell search, for example, an SSB may be searched, where the SSB indicates RMSI CORESET configuration, and the terminal device may acquire RMSI according to the RMSI CORESET configuration, where the RMSI is used to indicate the configuration information of the at least one initial active downlink BWP, then the terminal device may acquire the configuration information of the at least one initial active downlink BWP according to the RMSI, and then the terminal device may execute the communication method provided in the present disclosure according to the acquired configuration information of the at least one initial active downlink BWP.

Based on the content introduced above, those skilled in the art may determine that the network device also needs to determine the first initial active downlink BWP corresponding to the terminal device, so as to ensure that the terminal device can correctly receive the above information through the first initial active downlink BWP. The communication method on the network device side will be introduced below with reference to FIG. 13.

FIG. 13 is a second flowchart of a communication method according to an embodiment of the present disclosure.

As shown in FIG. 13, the method includes:

1301, send configuration information of at least one initial active downlink bandwidth part BWP to a terminal device.

The network device sends the configuration information of the at least one initial active downlink bandwidth part BWP to the terminal device, so that the terminal device may determine the first initial active downlink BWP according to the configuration information, so as to perform an initial access procedure.

The communication method according to the embodiment of the present disclosure includes: sending the configuration information of the at least one initial active downlink bandwidth part BWP to the terminal device so that the terminal device determines the first initial active downlink BWP corresponding to the terminal device according to the configuration information of the at least one initial active downlink BWP, so as to ensure that each terminal device selects the initial active down of BWP according to as actual requirements, thereby avoiding a problem of low communication efficiency caused by the same initial active downlink BWP of each terminal device.

On the basis of the above embodiments, the network device may also determine the first initial active downlink BWP corresponding to the terminal device according to the configuration information of the at least one initial active downlink BWP.

An implementation for the network device to determine the first initial active downlink BWP is the same as that for the terminal device to determine the first initial active downlink BWP, that is to say, the network device and the terminal device determine the first initial active downlink BWP based on a same method, then they two determine the same first initial active downlink BWP, which can effectively ensure that the terminal device successfully receives the first information.

An implementation of determining the first initial active downlink BWP corresponding to the terminal device according to the configuration information of the at least one initial active downlink BWP may refer to the introductions of the above embodiments on the terminal device side, which will not be repeated this time.

FIG. 14 is a first schematic structural diagram of a communication apparatus according to an embodiment of the present disclosure. Referring to FIG. 14, the communication apparatus 140 may include an acquiring, module 1401 and a determining module 1402, where the acquiring module 1401 is configured to acquire configuration information cilia least one initial active downlink bandwidth part BWP; and the determining module 1402 is configured to determine a first initial active downlink BWP corresponding to the terminal device according to the configuration information of the at least one initial active downlink BWP.

In a possible implementation, the determining module 1402 is specifically configured to:

determine the first initial active downlink BWP from the at least one initial active downlink BWP according to attribute information of the terminal device and the configuration information of the at least one initial active downlink BWP.

In a possible implementation, the attribute information includes at least one of the following: device identification, an access level, a service type, a terminal bandwidth, a number of antennas and/or a number of antenna ports, or a power consumption mode.

In a possible implementation, the configuration information includes at least one of the following: a bandwidth size, a frequency band position or subcarrier spacing.

In a possible implementation, the at least one initial active downlink BWP has a number which is a first number.

In a possible implementation, the configuration information further includes a number of the initial active downlink BWP.

In a possible implementation, the attribute information is the device identification;

a number of the first initial active downlink BWP is the same as a first result, where the first result is a result obtained by performing a modulo operation between the device identification of the terminal device and the first number.

In a possible implementation, the attribute information is the access level:

a number of the first initial active downlink BWP is the same as a second result, where the second result is a result obtained by performing a modulo operation between the access level of the terminal device and the first number.

In a possible implementation, the attribute information is the access level;

where the determining module 1402 is specifically configured to:

acquire a first corresponding relationship, where the first corresponding relationship is used to indicate a corresponding relationship between the access level and the initial active downlink BWP; and determine the first initial active downlink BWP corresponding to the access level of the terminal device from the at least one initial active downlink BWP, according to the first corresponding relationship and the access level of the terminal device.

In a possible implementation, the attribute information is the service type;

where the determining module 1402 is specifically configured to:

acquire a second corresponding relationship, where the second corresponding relationship is used to indicate a corresponding relationship between the service type and the initial active downlink BWP; and determine the first initial active downlink BWP corresponding to the service type of the terminal device from the at least one initial active downlink BWP, according to the second corresponding relationship and the service type of the terminal device.

In a possible implementation, the attribute information is the terminal bandwidth, and the configuration information of the first initial active downlink BWP further includes a first bandwidth supported by the first initial active downlink BWP.

In a possible implementation, the terminal bandwidth of the terminal device is equal to the first bandwidth.

In a possible implementation, the attribute information is the terminal bandwidth, and the bandwidth size of the first: initial active downlink BWP is less than or equal to the terminal bandwidth of the terminal device.

In a possible implementation, the bandwidth size of the first initial active downlink BWP is from a bandwidth size of each initial active downlink BWP that has a smallest difference with the bandwidth size of the terminal bandwidth.

In a possible implementation, the attribute information is the number of antennas and/or the number of antenna ports, and the configuration information further includes a number of first antennas of the terminal device and/or a number of first antenna ports of the terminal device supported by the first initial active downlink BWP.

In a possible implementation, a number of terminal antennas of the terminal device is the same as the number of first antennas; and/or a number of terminal antenna ports of the terminal device is the same as the number of first antenna ports.

In a possible implementation, the number of first antennas is less than or equal to the number of terminal antennas of the terminal device; and/or the number of first antenna ports is less than or equal to the number of terminal antenna ports of the terminal device.

In a possible implementation, the number of first antennas corresponding to the first initial active downlink BWP is from a number of first antennas of each initial active downlink BWP that has a smallest difference with the number of terminal antennas of the terminal device; and/or the number of first antenna ports corresponding to the first initial active downlink BWP is from a number of first antenna ports of each initial active downlink BWP that has a smallest difference with the number of terminal antenna ports of the terminal device.

In a possible implementation, the attribute information is the power consumption mode, and the configuration information further includes a paging period.

In a possible implementation, if the power consumption mode of the terminal device is a low power consumption mode, the paging period of the first initial active downlink BWP is a first paging period;

if the power consumption mode of the terminal device is a high power consumption mode, the paging period of the first initial active downlink BWP is a second paging period;

where the first paging period is greater than the second paging period.

In a possible implementation, the at least one initial active downlink BWP includes a synchronization signal.

In a possible implementation, the synchronization signal is located on a non-synchronous raster.

In possible implementation, the first initial active downlink BWP is used for the terminal device to receive first information, where the first information includes at least one of the following system information, a paging message, or a downlink signal of a random access procedure.

In a possible implementation, where the acquiring module 1401 is specifically configured to:

receive a system broadcast message from a network device, where the system broadcast message is used to indicate the configuration information of the at least one initial active downlink bandwidth part BWP; and acquire the configuration information of the at least one initial active downlink bandwidth part BWP according to the system broadcast message.

The communication apparatus provided in the embodiment of the present disclosure may execute the technical solutions shown in the above method embodiments; implementation principles and beneficial effects therebetween are similar, and are not repeated here.

Figure 15:
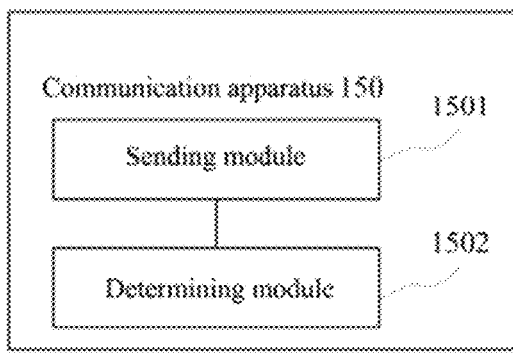
FIG. 15 is a second schematic structural diagram of a communication apparatus according to an embodiment of the present disclosure.

FIG. 15 is a second schematic structural diagram of a communication apparatus according to an embodiment of the present disclosure. Referring to FIG. 15, the communication apparatus 150 may include a sending module 1501, where:

the sending module 1501 is configured to send configuration information of at least one initial active downlink bandwidth pan BWP to a terminal device.

In a possible implementation, the communication apparatus further includes a determining module 1502;

where die determining module 1502 is configured to determine a first initial active downlink BWP corresponding to the terminal device according to the configuration information of the at least one initial active downlink BWP.

In a possible implementation, the determining module 1502 is specifically configured to:

determine the first initial active downlink BWP from the at least one initial active downlink BWP, according to attribute information of the terminal device and the configuration information of the at least one initial active downlink BWP.

In a possible implementation, the attribute information includes at least one of the following: device identification, an access level, service type, a terminal bandwidth, a number of antennas and/or a number of antenna ports, or a power consumption mode.

In a possible implementation, the configuration information includes at least one oldie following: a bandwidth size, a frequency band position or subcarrier spacing.

In a possible implementation, the at least one initial active downlink BWP has a number which is a first number.

In a possible implementation, the configuration information further includes a number of the initial active downlink BWP.

In a possible implementation, the attribute information is the device identification;

a number of the first initial active downlink BWP is the same as a first result, where the first result is a result obtained by performing a modulo operation between the device identification of the terminal device and the first number.

In a possible implementation, the attribute information is the access level;

a number of the first initial active downlink BWP is the same as a second result, where the second result is a result obtained by performing a modulo operation between the access level of the terminal device and the first number.

In a possible implementation, the attribute information is the access level;

the determining module 1502 is specifically configured to:

acquire a first corresponding relationship, where the first corresponding relationship is used to indicate a corresponding relationship between the access level and the initial active downlink BWP; and determine the first initial active downlink BWP corresponding to the access level of the terminal device from the at least one initial active downlink BWP, according to the first corresponding relationship and the access level of the terminal device.

In a possible implementation, the attribute information is the service type;

the determining module 1502 is specifically configured to:

acquire a second corresponding relationship, where the second corresponding relationship is used to indicate a corresponding relationship between the service type and the initial active downlink BWP; and determine the fast initial active downlink BWP corresponding to the service type of the terminal device from the at least one initial active downlink BWP, according to the second corresponding relationship and the service type of the terminal device.

In a possible implementation, the attribute information is the terminal bandwidth, and the configuration information of the first initial active downlink BWP further includes a first bandwidth supported by the first initial active downlink BWP.

In a possible implementation, the terminal bandwidth of the terminal device is equal to the first bandwidth.

In a possible implementation, the attribute information is the terminal bandwidth, and the bandwidth size of the first initial active downlink BWP is less than or equal to the terminal bandwidth of the terminal device.

In a possible implementation, the bandwidth size of the first initial active downlink BWP is from a bandwidth size of each initial active downlink BWP that has a smallest difference with the bandwidth size of the terminal bandwidth.

In a possible implementation, the attribute information is the number of antennas and/or the number of antenna ports, and the configuration information further includes a number of first antennas of the terminal device and/or a number of first antenna ports of the terminal device supported by the first initial active downlink BWP.

In a possible implementation, a number of terminal antennas of the terminal device is the same as the number of first antennas; and/or a number of terminal antenna ports of the terminal device is the same as the number of first antenna ports.

In a possible implementation, the number of first antennas is less than or equal to the number of terminal antennas of the terminal device; and/or the number of first antenna ports is less than or equal to the number of terminal antenna ports of the terminal device.

In a possible implementation, the number of first antennas corresponding to the first initial active downlink BWP is from a number of first antennas of each initial active downlink BWP that has a smallest difference with the number of terminal antennas of the terminal device; and/or the number of first antenna ports corresponding to the first initial active downlink BWP is from a number of first antenna ports of each initial active downlink BWP that has a smallest difference with the number of terminal antenna ports of the terminal device.

In a possible implementation, the attribute information is the power consumption mode, and the configuration information further includes a paging period.

In a possible implementation, if the power consumption mode of the terminal device is a low power consumption mode, the paging period of the first initial active downlink BWP is a first paging period;

if the power consumption mode of the terminal device is a high power consumption mode, the paging period of the first initial active downlink BWP is a second paging period;

where the first paging period is greater than the second paging period.

In a possible implementation, the at least one initial active downlink BWP includes a synchronization signal.

In a possible implementation, the synchronization signal is located on a non-synchronous raster.

In a possible implementation, the first initial active downlink BWP is used for the terminal device to receive first information, where the first information includes at least one of the following: system information, a paging message, or a downlink signal of a random access procedure.

In a possible implementation, the sending module 1501 is specifically configured to:

send a system broadcast message to the terminal device, where the system broadcast message is used to indicate the configuration information of the at least one initial active downlink bandwidth part BWP.

The communication apparatus provided in the embodiments of the present disclosure may execute the technical solutions shown in the above method embodiments; implementation principles and beneficial effects therebetween are similar, and are not repeated here.

Figure 16:
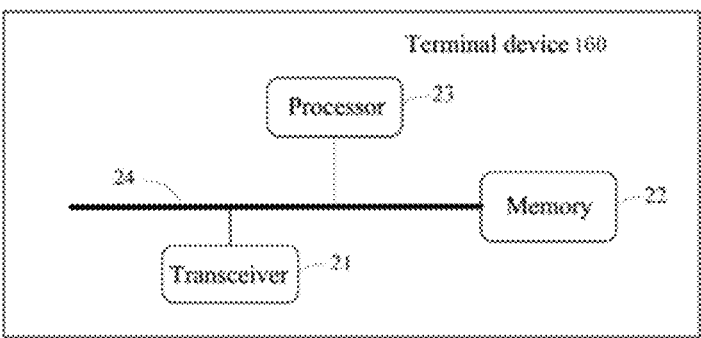
FIG. 16 is a schematic structural diagram of a terminal device according to an embodiment of the present disclosure.

FIG. 16 is a schematic structural diagram of a terminal device according to an embodiment of the present disclosure. Referring to FIG. 16, the terminal device 160 may include: a transceiver 21, a memory 22, and a processor 23. The transceiver 21 may include a transmitter and/or a receiver. The transmitter may also be referred to as a source, a transmitting unit, a transmitting port, or a transmitting interface or other similar descriptions; and the receiver may also be referred to as a sink, a receiving port, or a receiving interface or other similar descriptions. Exemplarily, the transceiver 21, the memory 22, and the processor 23 are connected to each other through a bus 24.

The memory 22 is configured to store program instructions;

the processor 23 is configured to execute the program instructions stored in the memory to cause the terminal device 160 to execute any one of the communication methods shown above.

The receiver of the transceiver 21 can be used to perform a receiving function of the terminal device in the above communication method.

Figure 17:
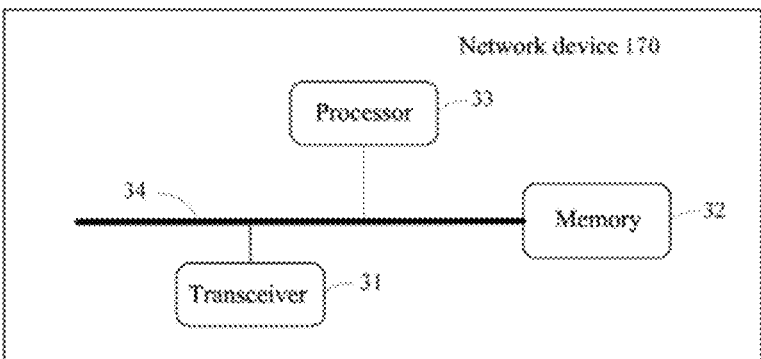
FIG. 17 is a schematic structural diagram of a network device according to an embodiment of the present disclosure.

FIG. 17 is a schematic structural diagram of a network device according to an embodiment of the present disclosure. Referring to FIG. 17, the network device 170 may include: a transceiver 31, a memory 32, and a processor 33, The transceiver 31 may include: a transmitter and/or a receiver. The transmitter may also be referred to as a source, a transmitting unit, a transmitting port, or a transmitting interface or other similar descriptions, and the receiver may also be referred to as a sink, a receiving port, or a receiving interface or other similar descriptions. Exemplarily, the transceiver 31, the memory 32, and the processor 33 are connected to each other through a bus 34.

The memory 32 is configured to store program instructions;

the processor 33 is configured to execute the program instructions stored in the memory to cause the terminal device 160 to execute any one of the communication methods shown above.

The receiver of the transceiver 31 can be used to perform a receiving function of the terminal device in the above communication method.

An embodiment of the present disclosure provides a computer readable storage medium, having computer executable instructions stored thereon, where when the computer executable instructions are executed by a processor, the above communication method is implemented.

An embodiment of the present disclosure provides a computer readable storage medium, having computer executable instructions stored thereon, where when the computer executable instructions are executed by a processor, the above communication method is implemented.

An embodiment of the present disclosure may also provide a computer program product, which may be executed by a processor, and when the computer program product is executed, any one of the communication method executed by a terminal device may be implemented.

The communication device, the computer readable storage medium, and the computer program product of the embodiments of the present disclosure may execute the communication method executed by the above terminal device, the specific implementation process and beneficial effects may refer to the above, and will not be repeated here.

In several embodiments provided in the present disclosure, it should be understood that the disclosed systems, apparatuses and methods may be implemented in other ways. For example, the apparatus embodiments described above are merely illustrative. For example, the division of the units is only a logical function division, and in an actual implementation, there may be other division manners, for example, multiple units or components may be combined or may be integrated into another system, or some features can be ignored or not be executed. On the other hand, the mutual coupling or direct coupling or communication connection shown or discussed may be an indirect coupling or communication connection through some interfaces, apparatuses or units, and may be electrical, mechanical or in other forms.

The units illustrated as separate components may or may not be physically separated, and the components displayed as units may or may not be physical units, that is, they may be located in one place, or may be distributed to multiple network units. Some or all of the units may be selected according to actual needs to achieve the objective of the solutions of the embodiments.

In addition, the functional units in the embodiments of the present disclosure may be integrated, into one processing unit, or each unit may exist physically separately, or two or more units may be integrated into one unit. The above integrated unit may be implemented in a form of hardware or may be implemented in a form of software functional unit.

A person of ordinary skill in the art may understand that: all or part of the steps in the above method embodiments may be completed by hardware related to a program instruction. The aforementioned computer program may be stored in a computer readable storage medium. When the computer program is executed by the processor, the steps including the above method embodiments are implemented; and the foregoing storage medium includes: a read-only memory (ROM), a random access memory (RAM), a magnetic disk, or an optical disk or other media that can store program codes.

Finally, it should be noted that: the above embodiments are only used to illustrate the technical solutions of the present disclosure, but not to limit it; although the present disclosure has been illustrated in detail with reference to the foregoing embodiments, those of ordinary skill in the art should understand that: the technical solutions recorded in the foregoing embodiments may still be modified, or some or all of the technical features may be equivalently substituted; and these modifications or substitutions do not make the essence of the corresponding technical solutions deviate from the scope of the technical solutions of the embodiments of the present disclosure.

What is claimed is:

1. A communication method, which is applied to a terminal device, comprising:

acquiring configuration information of multiple initial active downlink bandwidth parts (BWPs); and determining a first initial active downlink BWP corresponding to the terminal device according to the configuration information of the multiple initial active downlink BWPs;

wherein the configuration information comprises a bandwidth size;

wherein the determining the first initial active downlink BWP corresponding to the terminal device according to the configuration information of the multiple initial active downlink BWPs comprises:

determining the first initial active downlink BWP from the multiple initial active downlink BWPs, according to attribute information of the terminal device and the configuration information of the multiple initial active downlink BWPs; wherein the attribute information comprises a terminal bandwidth, and the bandwidth size of the first initial active downlink BWP is less than the terminal bandwidth of the terminal device;

wherein one of the multiple initial active downlink BWPs comprises a synchronization signal located on a synchronous raster, and others of the multiple initial active downlink BWPs comprise synchronization signals located on non-synchronous rasters.

2. The method according to claim 1, wherein the attribute information further comprises at least one of the following: device identification, an access level, a service type, a number of antennas and/or a number of antenna ports, or a power consumption mode.

3. The method according to claim 1, wherein the multiple initial active downlink BWPs have a number which is a first number.

4. The method according to claim 1, wherein the configuration information further comprises a number of the initial active downlink BWP.

5. The method according to claim 2, wherein the attribute information is the terminal bandwidth, and the configuration information of the first initial active downlink BWP further comprises a first bandwidth supported by the first initial active downlink BWP.

6. The method according to claim 5, wherein the terminal bandwidth of the terminal device is equal to the first bandwidth.

7. A communication apparatus, which is applied to a network device, comprising: a transceiver, a processor, and a memory;

wherein the memory has stored therein computer executable instructions;

the processor executes the computer executable instructions stored in the memory to cause the processor to:

send configuration information of multiple initial active downlink bandwidth parts BWPs to a terminal device;

wherein the configuration information comprises a bandwidth size;

determine a first initial active downlink BWP corresponding to the terminal device according to the configuration information of the multiple initial active downlink BWPs;

wherein the determination of the first initial active downlink BWP comprises:

determining the first initial active downlink BWP from the multiple initial active downlink BWPs, according to attribute information of the terminal device and the configuration information of the multiple initial active downlink BWPs; wherein the attribute information comprises a terminal bandwidth, and the bandwidth size of the first initial active downlink BWP is less than the terminal bandwidth of the terminal device;

wherein one of the multiple initial active downlink BWPs comprises a synchronization signal located on a synchronous raster and others of the multiple initial active downlink BWPs comprise synchronization signals located on non-synchronous rasters.

8. The apparatus according to claim 7, wherein the attribute information further comprises at least one of the following: device identification, an access level, a service type, a number of antennas and/or a number of antenna ports, or a power consumption mode.

9. The apparatus according to claim 7, wherein the multiple initial active downlink BWPs have a number which is a first number.

10. The apparatus according to claim 7, wherein the configuration information further comprises a number of the initial active downlink BWP.

11. The apparatus according to claim 8, wherein the attribute information is the terminal bandwidth, and the configuration information of the first initial active downlink BWP further comprises a first bandwidth supported by the first initial active downlink BWP.

12. The apparatus according to claim 11, wherein the terminal bandwidth of the terminal device is equal to the first bandwidth.

13. A terminal device, comprising: a transceiver, a processor, and a memory;

wherein the memory has stored therein computer executable instructions;

the processor executes the computer executable instructions stored in the memory to cause the processor to:

acquire configuration information of multiple initial active downlink bandwidth parts (BWPs); and determine a first initial active downlink BWP corresponding to the terminal device according to the configuration information of the multiple initial active downlink BWPs;

wherein the configuration information comprises a bandwidth size;

wherein the determination of the first initial active downlink BWP corresponding to the terminal device according to the configuration information of the multiple initial active downlink BWPs comprises:

determining the first initial active downlink BWP from the multiple initial active downlink BWPs, according to attribute information of the terminal device and the configuration information of the multiple initial active downlink BWPs; wherein the attribute information comprises a terminal bandwidth, and the bandwidth size of the first initial active downlink BWP is less than the terminal bandwidth of the terminal device;

wherein one of the multiple initial active downlink BWPs comprises a synchronization signal located on a synchronous raster, and others of the multiple initial active downlink BWPs comprise synchronization signals located on non-synchronous rasters.

\* \* \* \* \*